May 30, 1961   J. H. MURPHEY, JR   2,986,092
ROCKET GRAIN AND PROCESS FOR MAKING SAME
Filed Oct. 3, 1955   2 Sheets-Sheet 1
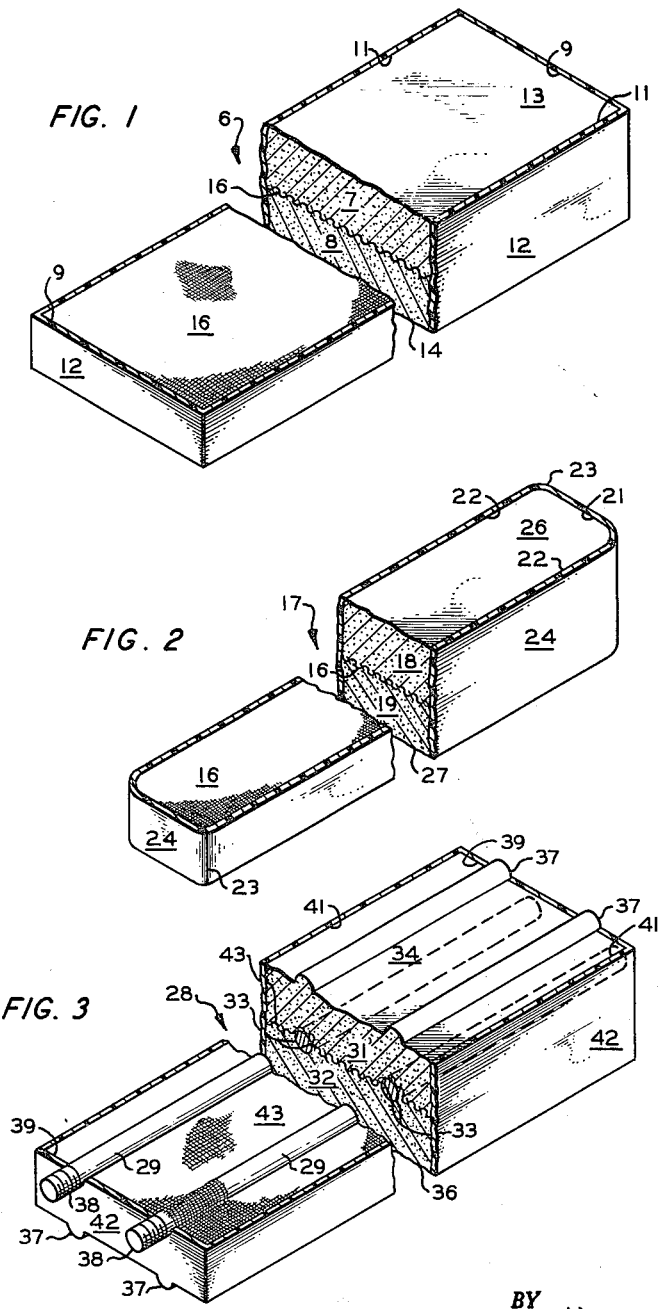
INVENTOR.
J.H. MURPHEY, JR
BY Hudson & Young
ATTORNEYS May 30, 1961   J. H. MURPHEY, JR   2,986,092
ROCKET GRAIN AND PROCESS FOR MAKING SAME
Filed Oct. 3, 1955   2 Sheets-Sheet 2

*INVENTOR.*
J.H. MURPHEY, JR.

BY Hudson & Young

*ATTORNEYS*

United States Patent Office 2,986,092
Patented May 30, 1961

2,986,092

ROCKET GRAIN AND PROCESS FOR MAKING SAME

Joseph H. Murphey, Jr., Lake Jackson, Tex., assignor to Phillips Petroleum Company, a corporation of Delaware Filed Oct. 3, 1955, Ser. No. 538,078

7 Claims. (Cl. 102—98)

This invention relates to a solid rocket grain. In one aspect this invention relates to a solid rocket grain of the restricted burning type for use in large rocket motors, especially the booster type. In a further aspect this invention relates to a process for making a rocket motor having an improved solid rocket grain. In some aspects the present invention may be regarded as an improvement of a rocket grain having a double web thickness as shown and claimed in the copending U.S. application, Serial No. 453,772, filed September 2, 1954, by Barnet R. Adelman, now Patent No. 2,939, 396.

In the operation of rocket motors, the thrust produced by the controlled burning of the propellent charge is substantially constant due to the escape of gas at a high velocity through the nozzle of the rocket motor. The burning of such propellent charges takes place substantially on only exposed burning surfaces and only to a very limited extent, if any, on those surfaces covered with and bonded to burning restrictive material. With propellent charges comprising rocket grains having a double web thickness, the burning rate is only one-half the burning rate otherwise required with those rocket grains having only one exposed burning surface. If for some reason the burning of rocket grains having exposed upper and lower surfaces proceeds at different rates on each of these exposed surfaces, fragments of the charge are liable to break off from the grain proper. Moreover, each web becomes increasingly thinner as burning progresses and just prior to the termination of the burning, a very thin layer or web of propellent material is left to be supported. This thin web will break up into fragments when subjected to the acceleration of the rocket. These fragments, or separated portions, will either individually burn at an uncontrolled rate and as a result build up pressure within the combustion chamber at a deleteriously excessive rate, or these fragments will be exhausted with the combustion gases with a consequent sharp drop in pressure due to the sudden decrease in burning surface area. Such separated portions may even be dislodged and thrown up against the retaining grid of the combustion chamber by the high velocity gas exhausting through the rocket motor nozzle where these separated portions likewise burn in an undesirable manner. The accelerated and uncontrolled combustion thereby resulting generates gas at an undue pressure build-up for a time shorter than that required for the necessary degree of maximum thrust. If a substantial portion of unburned propellent material is lost, the maximum thrust will not be obtained.

Accordingly, it is an object of this invention to provide an improved solid rocket grain having improved burning characteristics.

Another object is to provide an improved means for supporting or reinforcing solid rocket grains in such a manner that the incidence of fragmentation of the rocket grain during burning is substantially reduced.

A further object is to provide an improved rocket motor of the booster type having improved operational characteristics.

A still further object is to provide an improved process for the manufacture of novel rocket grains and their assembly in a rocket motor.

Other objects, advantages, and features will become apparent to one skilled in the art upon reading the following specification, appended claims and accompanying drawings in which:

Figures 1, 2, and 3 are isometric views partially in cross-section of various solid rocket grains having centrally disposed therein a sheet of reinforcing material in accordance with my invention;

Figure 4:
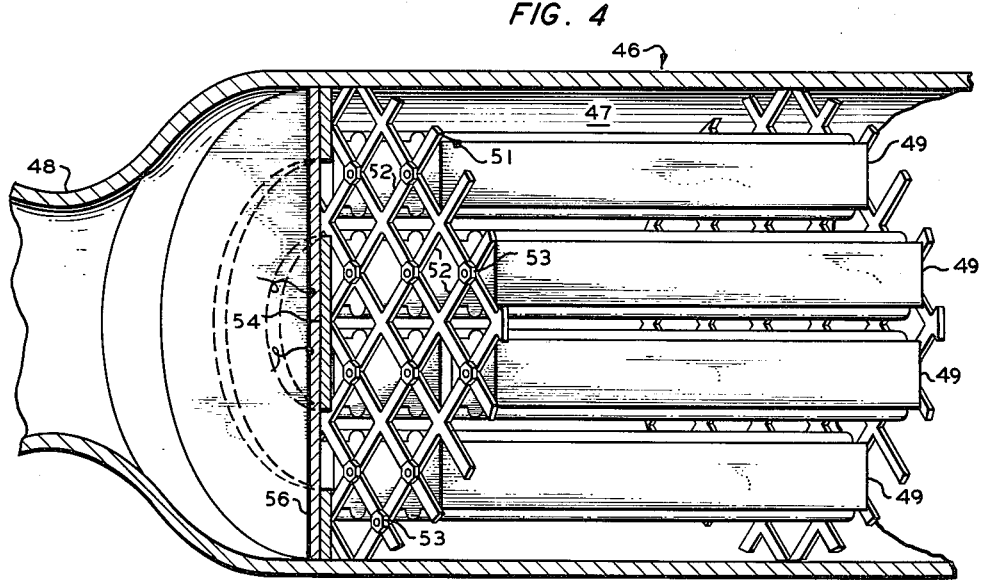
Figure 4 is a side elevation in partial cross-section of a rocket motor incorporating a plurality of grains of propellent material formed according to my invention.

According to my invention, there is provided a rocket grain which comprises two half-grains of rectangular parallelepiped configuration, said half-grains having interposed between them a layer or sheet of reinforcing material, the latter promoting controlled burning of the rocket grain in a manner hereinafter set forth in detail. The rocket grain (hereinafter to be referred to as the "composite" grain) is restricted on its two ends and side surfaces by burning restrictive material and unrestricted on its upper and lower surfaces. Because of the close adherence between the burning restrictive material and the aforementioned two end and side surfaces of the composite grain, no burning of the latter occurs along these surfaces, but, rather, all burning is confined to the exposed upper and lower surfaces.

Referring now to Figure 1, there is shown a composite grain 6 comprising two half-grains 7 and 8 of rectangular parallelepiped configuration. The composite grain 6 has ends 9 and sides 11 covered with a layer or coating of burning restricting material 12 while its upper surface 13 and lower surface 14, which surfaces are also the corresponding outer surfaces of half-grains 7 and 8 respectively, are exposed or unrestricted. The layer or sheet of reinforcing material 16 is interposed between the two half-grains 7 and 8.

Figure 2 shows a further embodiment of my improved rocket grain wherein composite grain 17 similarly comprises two half-grains 18 and 19 of rectangular parallelepiped configuration between which is interposed a layer or sheet 16 of reinforcing material. The ends 21 of composite grain are square and the sides 22 are rectangular. The advantage of the square ends 21 is that a plurality of these composite grains 17 can be fitted into the combustion chamber of a rocket motor more easily and with less wasted space, in some instances, than is true with the composite grain 6 shown in Figure 1. A feature of this embodiment is that composite grain 17 has rounded corners 23 which makes the composite grain 17 more stable to mechanical shock and is in general less subject to damage when being handled. Composite grain 17 has its two end 21 and side 22 surfaces covered with the layer of burning restricting material 24, described above, and has its upper surface 26 and lower surface 27 exposed or unrestricted.

It is desirable in some applications of solid rocket grains to provide additional support against mechanical shock. To this end, the composite rocket grain 28 shown in Figure 3 is equipped with internal support rods 29 which give strength to the composite grain 28 and also provide a means for attaching the composite grain 28 to a support grid in a rocket motor combustion chamber. Composite grain 28 similarly comprises two half-grains 31 and 32 of rectangular parallelepiped configuration, each half-grain being provided with centrally-disposed longitudinally-extending grooves 33 on its inner surface which form a perforation when the two half-grains 31 and 32 are fitted together. These grooves 33 are semi-circular in cross-section so as to receive the rod-like supporting members 29. In order to prevent the premature burning-off of the half-grains 31 and 32 from the support rods 29, the outer surfaces of the half-grains 31 and 32 (which surfaces are also the upper surface 34 and lower surface 36 respectively of the composite grain 28) are provided with outwardly-protruding, longitudinally-extending ribs 37 in alignment with the perforation formed by grooves 33. The total surface area of ribs 37 on upper surface 34 and lower surface 36 is equal to the surface area of the perforation. Thus, upper and lower surfaces of composite grain 28 compensate for the surface area occupied by the perforation and burning on these surfaces takes place evenly and without premature burning off of the propellent material from the support member 29.

Although Figure 3 shows the preferred embodiment of my improved rocket grain, it is within the scope of my invention to use more than two supporting rod-like members 29 (or even only one) together with the corresponding number of grooves 33 and compensating ribs 37. These supporting members 29 are adapted to tightly fit within the grooves 33. To provide means for attaching composite grain 28 to a support grid in the combustion chamber of a rocket motor, support members 29 can be threaded at protruding ends 38 and made of metal.

The composite grain of Figure 3 also has rectangular ends 39, sides 41, and upper surface 34 and lower surface 36. Ends 39 and sides 41 are covered with the layer of burning restricting material 42 and upper surface 34 and lower surface 36 are unrestricted. The layer or sheet of reinforcing material 43 may be made of double ply material with separations (not shown) provided between the two plies so as to receive the rod-like supporting members 29.

The layer or sheet of reinforcing material shown in Figures 1, 2, and 3 can be fabricated from resin-impregnated fiber glass, fiber glass cloth, canvas, nylon or other porous plastic filled reinforcing medium. The individual half-grains are adhesively bonded to the reinforcing material so that when the burning of these half-grains has sufficiently progressed to the point where there is only a thin layer or web of the half-grain remaining, i.e., a thin layer of unburned propellent material, that portion remaining, being thus adhesively bonded to the reinforcing material, will not separate or break off into fragments or pieces before the half-grain has been wholly consumed. This ensures a steady, controlled rate of burning which progresses uniformly within the required time until the composite grain is wholly consumed. In absence of my reinforcing material, unburned fragments of propellent grain would tend to break off and become lodged in the support grid with resultant dangerous build-ups in pressure within the combustion chamber or such fragments might be exhausted with the combustion gases with a consequent sharp decrease in pressure.

The layer of burning restricting material can be made from any of the slow-burning materials used for this purpose in the rocket art, such as cellulose acetate, ethyl cellulose, butadiene-methylvinylpyridine copolymer, GRS, and the like. Also, metal plates can be secured to the sides and/or ends of the composite grain by plastic or rubber cements or these materials may be bonded by curing. Support for the composite grain is thereby provided as well as restriction of the surfaces. The bond between the composite grain and the restrictor must be strong and tight in order that no burning of the composite grain occurs along the sides and the ends contacting the restricting material, as is well known in the prior art. Although the practice of this invention is not to be unnecessarily limited to any specific restrictor compositions, suitable synthetic rubber compositions having the following recipes are set forth for illustrative purposes.

GR-S RESTRICTOR RECIPE

|  | Parts per 100 parts of rubber |
|---|---|
| GR-S 1505 [1] | 100 |
| Carbon black (Philblack A) | 50 |
| Zinc oxide | 3 |
| Sulfur | 1.5 |
| Flexamine [2] | 1.5 |
| Stearic acid | 1.5 |
| Pentaryl A [3] | 10 |
| Wood rosin | 5 |
| Butyl eight [4] | 3.5 |

BUTADIENE/METHYLVINYLPYRIDINE RESTRICTOR RECIPES

[Recipe I]

|  | Parts per 100 parts of rubber |
|---|---|
| Butadiene/methylvinylpyridine (90/10) | 100 |
| Carbon black (Philblack A) | 60 |
| Zinc oxide | 3 |
| Dibutylphthalate | 50 |
| Wood rosin | 5 |
| Chloranil | 3 |

[Recipe II]

|  | Parts per 100 parts of rubber | |
|---|---|---|
| Butadiene/methylvinylpyridine | 100 | 100 |
| Carbon black (Philblack A) | 20 | 40 |
| Epichlorohydrin | 8 | |
| Sulfur | 2 | 1.75 |
| Zinc oxide | 6 | 3.0 |
| Flexamine [2] | | 1.5 |
| Wood resin | | 5 |
| Liquid polybutadiene | 100 | 10 |
| Dibutylphthalate | | 5 |
| Bulyl eight [4] | 6 | 3 |
| Ammonium carbonate | 5 | 7.5 |

[1] 90/10 butadiene/styrene.
[2] A physical mixture containing 65% of a complex diarylaminoketone reaction product and 35% of N,N'-diphenyl-p-phenylenediamine.
[3] Amylbiphenyl.
[4] Dithiocarbamate-type rubber accelerator.

Since the rocket grains of my invention burn on the upper and lower surfaces simultaneously, each composite grain must be mounted in a rocket motor combustion chamber in spaced relationship with respect to each other in order that this burning can occur. In Figure 4, there is shown in a schematic way, a side elevation of a rocket motor 46 partially in cross-section having a cylindrical combustion chamber 47 the rear end of which is shaped to define a nozzle or venturi 48 for the discharge of combustion gases at a high velocity. Obviously, a separate nozzle portion could be substituted for the integral construction shown. Disposed in chamber 47 are a plurality of composite grains 49 formed according to my invention. Rocket grain frame 51 comprises a support grid made of crossing bars 52 in which frame a plurality of my composite grains 49 (such as shown in Figures 1–3) are supported in spaced relationship with respect to one another. Threaded ends of the rod-like supporting members extend through the holes at the intersection of bars 52 and are secured thereto by a nut 53. The operation of the rocket motor 46 may be initiated by the ignition of the composite grains 49 in chamber 47 by any conventional means, such as an electrically initiated igniter 54 mounted within chamber 47 adjacent to a blowout type sealing disk 56 which is provided across the forward end of venturi 48.

Figure 5:
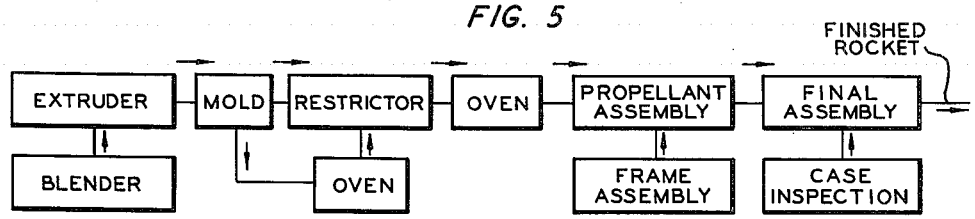
Figure 5 is a block diagram showing the main steps of a method for making a rocket motor in accordance with my invention.

The principal manufacturing steps followed in making my novel rocket grain, assembling a plurality of such grains, and charging a rocket motor with such an assembly, are set forth in the block diagram and flow chart shown in Figure 5. References should be made to that flow chart in conjunction with the following discussion and specific example.

As a first step in the process of my invention the oxidizer is incorporated into the binder composition by mixing in a temperature-controlled blender comprising a drum surrounding hollow water-cooled rotary arms which accomplish the mixing. The blending step raises the temperature of the mixture to the range of 180 to 190° F. which is approximately the temperature of extrusion. The mixture from the blender passes to an extruder which may be of the screw or plunger type. Considerable heat is developed in the screw-type extruder, which brings the material to good extrusion temperature and cooling coils are provided to remove any excessive heat. The half-grains are extruded through a water cooled die to a cooled die-extension chamber where the extrusion is further cooled and retained in its proper shape while the desired length of extruded half-grains are cut off to form one side of the finished grain. The half-grains of my invention can be extruded so as to comprise, for instance, approximately 30 pounds of propellent material and a composite grain comprising two such half-grains weighing approximately 60 pounds can be formed in a manner hereinafter to be set forth in detail. A plurality of these composite grains may be assembled in any suitable manner to provide a propellent charge having any desired size. For example, to provide a 6000 pound propellent charge, composite grains are made of about 60 pounds of propellent material and about 100 of these composite grains are arranged in the combustion chamber of a rocket motor. It is obvious that the extrusion equipment required to extrude the relatively small half-grains of the instant invention, for example 30 pounds of propellent material, presents greater ease of manufacture, whereas extrusion equipment for a 6000 pound grain is not practical. Also, there is much greater safety to personnel and much less economic risk in handling the smaller sized half-grains and composite grains of the instant invention than there is in handling a 6000 pound grain.

Two of the extruded half-grains, such as shown in Figure 3, are oriented symmetrically within the two sides of a mold. One half-grain is placed in a lower mold cavity, one or more metal support rods are positioned in the longitudinal grooves in the extruded half-grain; then a layer of reinforcing material is placed over the half-grain and rods; the second half-grain is oriented in an upper mold cavity and the mold is closed to form a rough composite grain which is removed from the mold, trimmed to remove flashing and stacked for the next step. The composite grain forms with support rods in place, are then restricted on the two side and end surfaces with a difficultly burning material which can be cemented or cured to the composite grain surfaces which are to be restricted. The restricted composite grains are placed on a slow moving belt passing through an oven wherein they are maintained at a temperature of 175±5° F. for a period of 16 to 24 hours. The cured composite grains are removed from the oven, assembled in rocket motor frames and one or more of the loaded frames are inserted in the combustion chamber of a rocket motor.

It is known in the art to make many different types of propellent material by incorporating oxidizers in binder compositions. Materials which have been utilized as binders comprise asphalt, rubber, pitch, rosin, synthetic rubber copolymers and various synthetic plastics including nitrocellulose and similar oxidizable materials. There materials are characterized by being solid and having good mechanical strength at the ambient temperatures of rocket firing. Many of these materials are extrudable at moderate temperatures in their uncured state so that heat sensitive oxidizers, accelerators and burning rate catalysts such as ammonium nitrate, ammonium dichromate, ammonium perchlorate, ammonium chlorate, guanidine nitrate and nitroguanidine and urea can be utilized in these extrusion processes for preparing the rocket grains.

In order to provide a short duration propellant two functions, web thickness and propellent burning rate, are important in determining the design of the propellent grain. Many good extrudable binder-oxidizer propellent recipes are available with satisfactory burning rates for use in the novel propellent grains of this invention. This is partly true because the plank shape of the present composite grains means a large burning surface is provided by the double web composite grain. Also the novel support imparted to the individual grains by practicing the process of my invention makes practical the use of very thin webs.

The rocket grains which can be utilized in the practice of this invention can be prepared from several known propellent materials. The following is a typical formulation for the preparation of propellent material and it is to be understood that it is set forth for illustrative purposes only and does not unduly limit the invention.

| | Parts per 100 parts of rubber | Parts weight, percent |
|---|---|---|
| Binder | | 17.5 |
|   Butadiene/methylvinylpyridine (90/10) | 100 | |
|   Carbon black | 10–30 | |
|   TP-90B [1] | 10–30 | |
|   Flexamine [2] | 0–5 | |
|   Aerosol-OT [3] | 0–2 | |
|   Sulfur | 0–2 | |
|   SA-113 [4] | 0–2 | |
|   Zinc oxide | 0–5 | |
| Oxidizer | | 82.5 |
|   Ammonium nitrate (70.1–78.4). | | |
|   Ammonium perchlorate (4.1–12.4) | | |
| Catalyst: Milori blue [5] | | 1.0–2.0 |

[1] Dibutyl carbitol formal.
[2] A physical mixture containing 65% of a complex diarylamine ketone reaction product and 35% of N,N'-diphenyl-p-phenylenediamine.
[3] Dioctyl ester of sodium sulfosuccinic acid.
[4] N,N-dimethyl-S-tertiary butyl sulfenyl dithiocarbamate.
[5] A pigment similar to Prussian blue but a red tint, prepared by the oxidation of a paste of potassium ferrocyanide and ferrous sulfate.

Other binder compositions such as polysulfide rubber, nitrocellulose, GRS, etc., may be utilized. Carbon black has been found to be a good filler material and it has been established that the burning rate of these grains can be stabilized and controlled by the use of proper amounts of magnesium oxide or zinc oxide. The cure of a butadiene/methylvinylpyridine copolymer can be effected with Milori blue whereas in other copolymer binder formulations, sulfur and vulcanization accelerators must be used.

EXAMPLE

As a specific example of the composite grain made by the process of my invention, the method of manufacturing a rocket grain for a large booster rocket requiring 6,000 pounds of propellent material will be described. The rocket case is 30 inches in diameter by 16 feet long and the composite rocket grain is specified to have a burning duration of four seconds. In this case the extruded half-grains have a burning rate of 0.25 inch/sec. and are one inch thick with two longitudinal semi-perforations or grooves on one side and compensating protuberances or ribs on the opposite side to provide a near-constant burning surface and to prevent premature burn-through to the supporting rods. Two of these half-grains, which are four feet in length, are oriented in half molds and steel support rods are placed in the semi-perforations or grooves in the half-grain in the lower mold cavity. A layer of glass fiber which is prepared from lime-alumina-boro silicate glass and known to the trade as "E" glass, is placed over the rod-containing half grain in the lower mold cavity. This material is available and is used in an alkyd resin loaded form. The upper mold member containing the other half-grain is then turned over the lower mold member and pressed to form an uncured rough composite rocket grain. The mold is opened, flashing material is trimmed off, thet mold is reclosed to smooth the trim marks, reopened and the uncured composite grain is removed from the mold. The composite grain passes to a restricting room where both side and both end surfaces of the composite grain are covered with sheeted butadiene/methylvinylpyridine 80/20 copolymer. The restricted composite grains are placed on a slow moving belt and cured in an oven maintained at a temperature of 175±5° F. for 24 hours.

The reinforced layer or strip placed between the two the two half-grains cures to a high strength supporting material and lends sufficient mechanical support to the composite grain which weighs approximately 60 lbs. so that the material does not sag on the support rods and so that the propellent material is not torn from the support rods during firing or burning.

While "E" glass in loaded form was utilized in setting forth the specific example described above, unloaded fiber glass, glass cloth, nylon, canvas or pre-mixed alkyd fiber glass materials can be utilized. Suitable plastics which can be used with unloaded fiber glass, with slight variations in the usual curing techniques, include polyester (alkyd) resins, epoxy resins, phenolics, melamines, and silicones.

Since many possible variations and modifications may be made of this invention by those skilled in the art without departing from the scope thereof, it is to be understood that all matter herein set forth in the discussion and example or shown in the accompanying drawings are merely illustrative and do not unduly limit the invention, Having described my invention, I claim:

1. A solid rocket grain comprising two complementary, rectangular parallelepipeds of extrudable, imperforate propellent material comprising a rubbery binder and a solid oxidizer, each of said parallelepipeds having at least one centrally-disposed, longitudinally-extending groove on a first surface, said first surfaces of said parallelepipeds separated from each other by a layer of adhesively bonded, plastic filled reinforcing material, a rod-like supporting member in the longitudinally-extending perforation formed by said grooves, each of said parallelepipeds having at least one exposed outwardly-protruding, longitudinally-extending rib on a second surface and in alignment with said groove, the total surface area of said rib being equal to the surface area of said groove, said grain being restricted on its ends and sides with slow-burning, rubbery restricting material and being unrestricted on its upper and lower surfaces.

2. A solid propellent grain in accordance with claim 1 in which each of said parallelepipeds have two centrally disposed, longitudinally-extending grooves on said first surface, the axis of both said grooves being in the same horizontal plane, and wherein a rod-like supporting member extends through each of the perforations so formed and protrudes beyond the ends of said grain, said supporting members having threaded ends.

3. A solid rocket grain in accordance with claim 1 wherein said reinforcing material comprises plastic-loaded fibrous material.

4. A solid rocket grain in accordance with claim 1 wherein said reinforcing material comprises glass fiber prepared from lime-alumina-boro silicate glass.

5. A solid rocket grain in accordance with claim 1 wherein said reinforcing material comprises fiber glass cloth.

6. A solid rocket grain in accordance with claim 1 wherein said reinforcing material comprises canvas.

7. A solid rocket grain in accordance with claim 1 wherein said reinforcing material comprises an alkyd resin-loaded fiber glass.

References Cited in the file of this patent

UNITED STATES PATENTS

| | | |
|---|---|---|
| 186,211 | Miltimore | Jan. 16, 1877 |
| 766,455 | Maxim | Aug. 2, 1904 |
| 1,074,809 | Newton | Oct. 7, 1913 |
| 1,920,075 | Haenichen | July 25, 1933 |
| 1,923,761 | Snelling | Aug. 22, 1933 |
| 2,446,560 | Skinner | Aug. 10, 1948 |
| 2,464,181 | Lauritsen | Mar. 8, 1949 |
| 2,484,355 | Parsons | Oct. 11, 1949 |
| 2,488,154 | Africano | Nov. 15, 1949 |
| 2,539,404 | Crutchfield | Jan. 30, 1951 |
| 2,687,667 | Gunther | Aug. 31, 1954 |
| 2,857,258 | Thomas | Oct. 1, 1958 |
| 2,877,504 | Fox | Mar. 17, 1959 |

FOREIGN PATENTS

| | | |
|---|---|---|
| 7178 | Great Britain | of 1897 |